July 23, 1940.    L. M. BILLMAN ET AL    2,209,020
MATURITY TESTING DEVICE
Filed June 22, 1939    2 Sheets-Sheet 1

INVENTORS
L. M. BILLMAN
A. E. DeGROOT
BY
ATTORNEYS

July 23, 1940.  L. M. BILLMAN ET AL  2,209,020
MATURITY TESTING DEVICE
Filed June 22, 1939  2 Sheets-Sheet 2

INVENTORS
L. M. BILLMAN
A. E. DE GROOT

BY

ATTORNEYS

Patented July 23, 1940

2,209,020

UNITED STATES PATENT OFFICE 2,209,020

MATURITY TESTING DEVICE

Loyde M. Billman, Washington, D. C., and Alfred E. De Groot, Arlington, Va., assignors to Henry A. Wallace, as Secretary of Agriculture of the United States of America, and his successors in office Application June 22, 1939, Serial No. 280,598

1 Claim. (Cl. 265—12)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a device for use in determining the maturity of certain food products, such as corn, particularly canned corn.

Heretofore the maturity of canned corn was determined by individuals who would chew a sample of the corn. The individual chewing this sample would determine from its taste and resistance to crushing the grade or quality of the sample, based upon his past experience with other samples. It is obvious that such a method is very imperfect, depending too much on the idiosyncrasies of the sampler. The human element involved in such a method of sampling is too uncertain and the method itself is too slow to satisfy scientific requirements in this field. One's sensitiveness to taste and chewing effort may vary from day to day and from time to time. The present invention seeks to obviate this undesirableness.

It has been found that the maturity of certain food products is a function of the force required to shear the skin. For example, in the case of corn, particularly canned corn, the force required to shear a disc from the skin or pericarp of the kernel is a function of its maturity. The present invention, accordingly, comprises an apparatus designed to shear the skin of the food product and, at the same time, record the force required to accomplish the shearing. By these means maturity may be determined without in any way involving the human element, and the determination is reduced to a purely mechanical operation.

The following description, considered together with the accompanying drawings, will fully disclose this invention, its construction, arrangements, combinations, and operations of parts and further objects and advantages thereof will be apparent.

Figure 1:
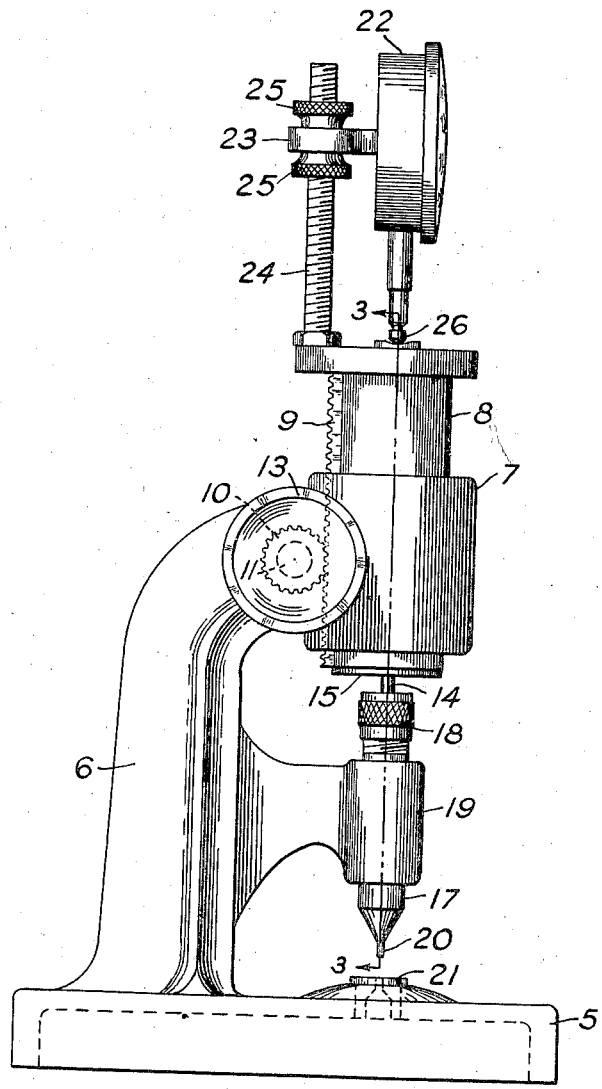
Figure 1 is a side elevational view of an embodiment of this invention.
Figure 3:
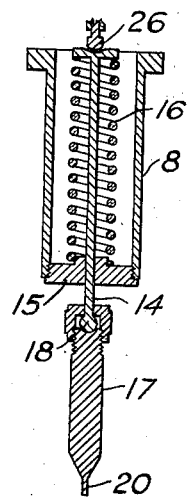
Figure 3 is a section along the line 3—3 of Figure 1.
Figures 2, 4:
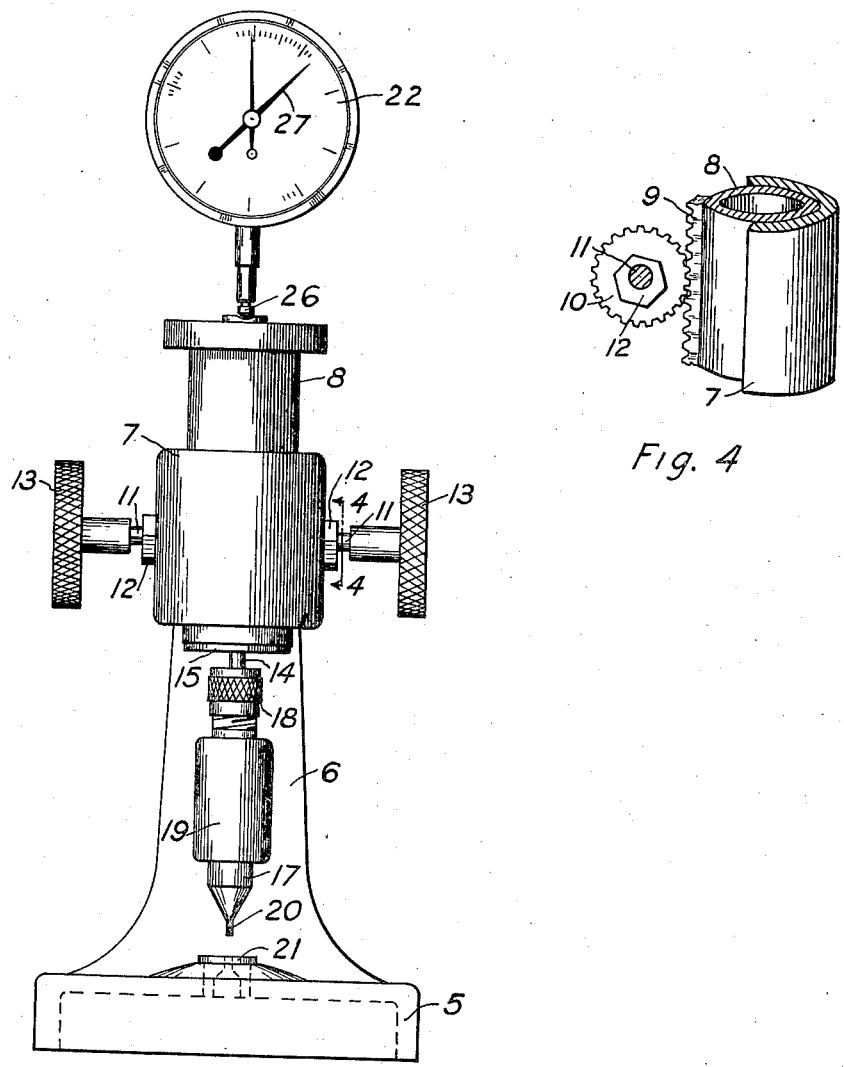
Figure 2 is a front elevational view of Figure 1.
Figure 4 is a fragmentary view of a section along the line 4—4 of Figure 3.

Referring with more particularity to the drawings, in which like numerals designate like parts, the device is mounted on a suitable frame structure comprising a hollow base section 5 and an upright support 6 secured on the base section. A vertical sleeve housing 7 is bracketed to the upper end of the support 6, substantially as shown, and a tube or cylinder 8 is slidably engaged with said sleeve housing 7. A rack gear 9, preferably diagonally cut, is secured in a vertical position to the cylinder 8 and meshes with a pinion 10 fixed to a shaft 11 rotatably mounted on the upright support 6 through adjustable eccentric bearings 12. Thumb grips 13 are provided for manually rotating the pinion shaft 11.

Within the cylinder 8 a rod 14 is coaxially disposed extending through and slidably engaged with its lower end plug 15. A coil spring 16 is mounted concentric with said rod 14 within the cylinder 8, substantially as shown, the upper end being fixed to the rod 14 and the lower end to the end plug 15 of the cylinder 8.

The lower end of the rod 14, extending through the plug 15, is secured to a punch bar 17 by means of an adjustable alignment link-nut joint 18. Said bar 17 is slidably engaged with a vertical sleeve housing 19 secured to the upright 6. The end of the punch bar 17 is provided with a punch 20, preferably circular in cross section, and substantially one-sixteenth of an inch in diameter so as to duplicate as closely as possible the largest unitary contact surface made with a human set of teeth. Beneath the punch 20, a die 21 is fixed on the base section 5, and is adapted to register with the punch 20. The opening in the die 21 extends through the thickness of the top of base section 5 so that sheared pieces, after each operation, fall below into the hollow portion of the base section.

On top of the cylinder 8 a gauge 22 is adjustably mounted by means of a lug bracket 23 slidably engaging a threaded stanchion 24 and held in selective positions by two knurled head adjusting nuts 25, 25. The actuating plunger 26 of the gauge 22 forceably abuts the rod 14.

The operation of this invention is as follows: The product to be tested for maturity is centered on the die 21. Thumb grips 13 are then rotated clockwise, as viewed in Figure 1. This has the effect of lowering the cylinder 8 and its appurtenant parts, without any change of relation therebetween, until the punch 20 comes to bear against the product to be tested. Rotation of grips 13 is then continued slowly. From this it will be understood that the application of force on the product being tested is made from the cylinder 8 to the rod 14 through tension in the spring 16. Consequently, the greater the resistance to shear encountered in the sample being tested, the greater will be the displacement between the rod 14 and the cylinder 8. This displacement is a function of the tension of spring 16 and it is measured by the gauge 22, which is a displacement type gauge calibrated for the spring 16. By providing the gauge 22 with a maximum indicater 27, the maximum force required to shear through the sample is readily obtained and may be translated into maturity grades based upon empirical findings.

The function of the eccentric bearings 12 is to take up any lost motion which may develop between the rack 9 and the pinion 10, due to wear. This is accomplished by an adjustment consisting of turning the bearings 12 so as to throw the pinion 10 toward the rack 9 sufficiently to take up this slack.

Having thus described our invention, we claim:

A device of the character described comprising a base section, a die on said base section, an upright support fixed to said base section, a sleeve housing fixed to said support, a cylinder slidably engaged with said sleeve housing, a rack on said cylinder, a pinion on said support meshed with said rack, a rod coaxially disposed in said cylinder and extending through the bottom thereof, a punch member fixed to the lower end of said rod adapted to register with said die, means for guiding said punch in line with said die, a coil spring mounted within said cylinder concentric with said rod, the upper end of said spring being fixed to said rod and the other end to said cylinder, means for measuring relative displacements between said rod and said cylinder, an adjustable support for said means, said support being carried by said cylinder, said measuring means having an actuated member engaging the upper end of said rod and normally holding said spring under tension.

LOYDE M. BILLMAN.
ALFRED E. DE GROOT.